No. 765,972. PATENTED JULY 26, 1904.
P. HEYDE & J. E. MITCHELL.
PROCESS OF TREATING FOOD PRODUCTS.
APPLICATION FILED APR. 21, 1904.
NO MODEL.
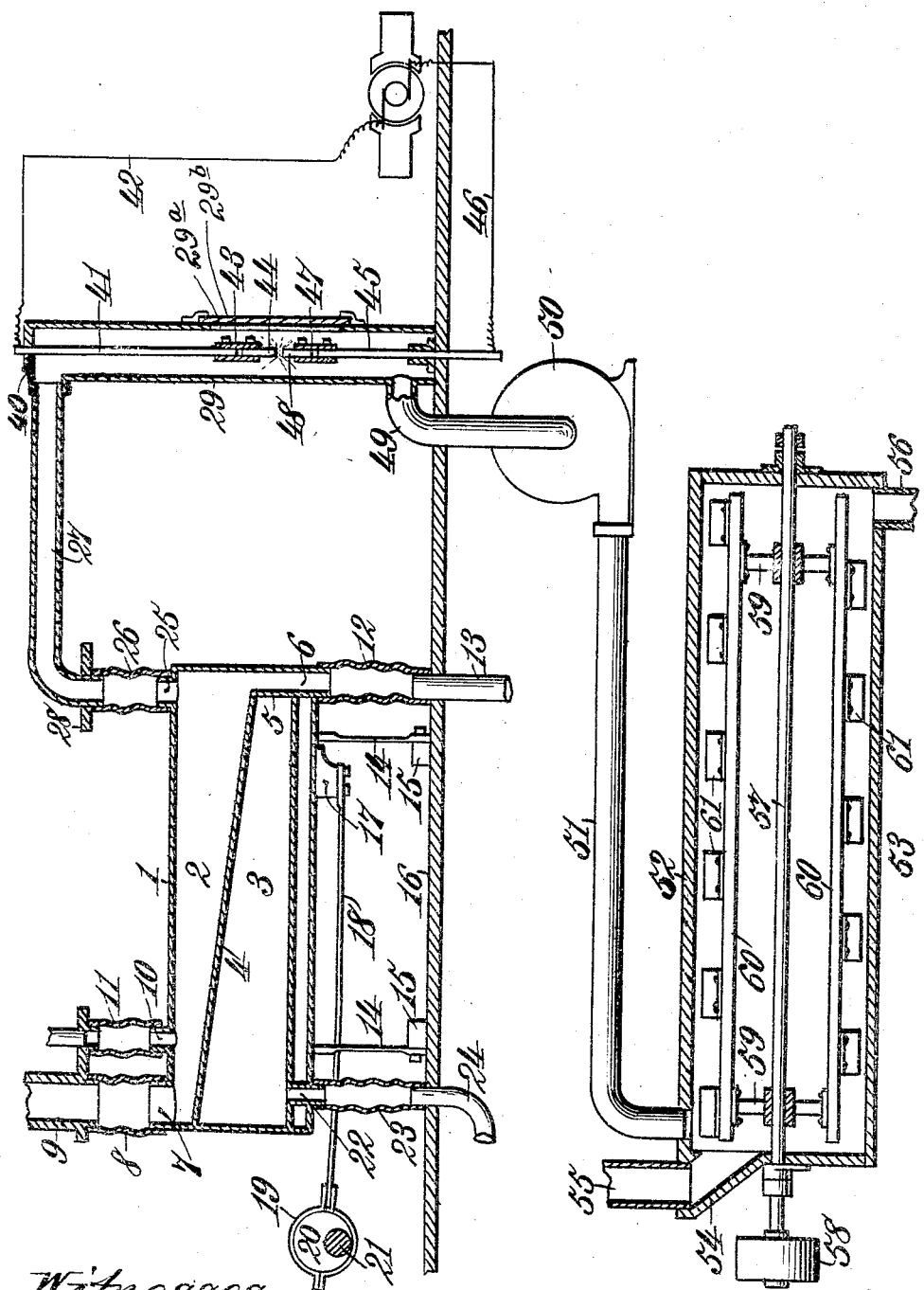
Witnesses.
Robert Everitt.
James L. Norris, Jr.
Inventors.
Philip Heyde.
John E. Mitchell.
By James L. Norris
Atty.

No. 765,972. Patented July 26, 1904.

UNITED STATES PATENT OFFICE.

PHILIP HEYDE, OF JACKSON, AND JOHN E. MITCHELL, OF ST. LOUIS, MISSOURI.

PROCESS OF TREATING FOOD PRODUCTS.

SPECIFICATION forming part of Letters Patent No. 765,972, dated July 26, 1904.

Application filed April 21, 1904. Serial No. 204,286. (No specimens.)

*To all whom it may concern:*

Be it known that we, PHILIP HEYDE, residing at Jackson, in the county of Cape Girardeau, and JOHN E. MITCHELL, residing at St. Louis, State of Missouri, citizens of the United States, have invented new and useful Improvements in Processes of Treating Food Products, of which the following is a specification.

This invention relates to a novel process for improving the quality of food products, and has for its object to enable a portion of the strength, aroma, and nutritious properties of one product to be imparted to another product or the like properties restored in part to one and the same product after its treatment in a given manner, which properties might otherwise be lost so far as such product is concerned.

While the invention may have a wide range of application, it is particularly intended and will probably find its widest effective application in partially restoring or adding flavor and strength or proteids to wheat-flour.

In the modern process of milling wheat-flour an elaborate system of grinding, separating, and purifying is employed to remove all discoloring-matter, and while flour very white and free from practically all discoloring-matter may thereby be produced such result is accomplished with more or less sacrifice of the strength and flavor and the offal will contain some very nutritious and highly-flavored parts of the wheat-berry.

It is the aim of our invention to enable a portion of the strength and flavor from the offal to be removed and imparted to the finished flour.

It is also an object of the invention to provide means for subjecting the vapors or volatilized constituents of the germ and offal to the action of an electric discharge to sterilize the same and also to enable the volatilized or vaporized constituents to more readily combine with the flour.

In order that the invention may be clearly understood, we have illustrated the same in the accompanying sheet of drawing, in which the view represents in sectional elevation the apparatus forming the subject-matter of this invention.

Referring to the drawing, 1 indicates the vaporizer, comprising a casing, preferably of metal, having an upper compartment 2 and a lower compartment 3, the two compartments being formed by means of an inclined sheet-metal plate or diaphragm 4, extending from one end and near the upper side of the casing downward to near the other end and lower side of the casing and at this latter point having its end portion bent downward, as indicated at 5, to form, with the end of the casing, an outlet-duct 6. On the upper side of the casing and at one end, hereinafter termed the "inlet" end, is provided an inlet-pipe 7, over which is secured a flexible duct 8, the other end of which is secured in or to a spout 9. Near to the inlet-pipe 7 is arranged a smaller inlet 10, to which is secured a flexible pipe 11, leading to a suitable source of steam or water supply. Connected to the outlet 6 is a flexible duct 12, which at its opposite end is connected to a discharge-chute 13. The vaporizer 1, as a whole, is mounted on spring-arms 14, near opposite ends, said spring-arms being secured at their lower ends to cleats 15, mounted on the floor or base 16. Mounted on the casing 1 in any suitable place, preferably on the lower side and toward the discharge end thereof, is a boss 17, to which is secured one end of a rod 18, the opposite end of which is secured to a strap 19, encircling an eccentric 20, secured on a shaft 21, suitable means (not shown) being provided for rotating the shaft 21 whereby to impart a vibratory movement to the casing 1. At the inlet end of the casing 1 and on its under side is provided an inlet-pipe 22, communicating with the compartment 3, about which inlet-pipe is secured one end of a flexible pipe 23, the opposite end of which is secured over a pipe 24, leading to a suitable source of live-steam supply. At the discharge end of the casing 1 and on its upper side is provided an outlet-pipe 25, communicating with the compartment 2, over which is secured one end of a flexible pipe 26, the opposite end of which is passed over the end of a conduit 27, passing through a suitable support 28. The opposite end of the conduit 27 is secured to and communicates with the upper end of an upright cylinder 29. The upper end of this cylinder is closed by a cap or head 40, in which is adjustably mounted a conductor 41, connected, by means of a wire 42, with one side of a dynamo or other source of electricity. The lower end of this conductor carries a clamp 43, in which may be secured a contact-point or electrode proper, 44. In the lower end of the cylinder 29 is adjustably secured a similar conductor 45, connected, by means of a wire 46, with the other side of the source of electricity referred to and provided with a clamp 47, carrying a contact-point or electrode 48.

In reference to the parts just described it will be apparent that the rods 41 may themselves operate as electrodes and the clamps 43 and 47, bearing contact-points, be dispensed with; but the construction described is more economical, as it permits the contact-points to be readily removed when burned away and new contact-points inserted. The cylinder 29 may be provided with a suitable opening 29$^a$, covered by a slide or door 29$^b$, to permit access to the interior for the purpose described. From the lower end of the cylinder 29 a pipe 49, communicating with said cylinder, leads to the interior of a pump-blower or similar device 50, to the discharge end of which is connected a pipe 51, leading to one end and communicating with the interior of a mixer 52. The said mixer comprises a cylindrical casing 53, provided at one end with an inlet-spout 54, to which is connected a chute 55 for feeding flour into the casing 53. At the opposite end of the casing is provided a discharge pipe or duct 56. Mounted in opposite ends of the casing and extending through the same is a shaft 57, provided with suitable means whereby it may be rotated, as a pulley 58, and on said shaft near opposite ends of the casing are mounted spiders 59, to which are secured bars 60, provided throughout their length with flights 61, which are shaped in a manner to agitate the flour and convey it from the inlet 54 to the discharge-outlet 56.

In the operation of the apparatus offal and germ are fed into the compartment 2 through the inlet 7 upon the plate or diaphragm 4, and the shaft 21 being rotated the casing 1 will be agitated through the medium of the mechanism described and the said offal and germ will slide down the said plate or diaphragm toward the discharge-duct 6, through which it will eventually pass. At the same time a spray of water, or, preferably, steam, is admitted through the inlet 10 to moisten the offal and germ, and live steam is admitted from the pipe 24 into the compartment 3, thereby heating the plate 4 and vaporizing the moisture absorbed by the offal and also vaporizing or volatilizing a portion of the proteid constituents thereof. The resultant vapor is drawn out of the casing through the outlet 25 and through the conduit 27 to and through the cylinder 29 by the action of the fan 50, and in its passage through the said cylinder 29 it is subjected to the action of the electric discharge occurring between the electrodes 44 and 48. It is then forced through the pipe 51 into the mixer 52, into which flour is continuously fed through the spout 54. Here the electrified vapor containing a portion of the constituents of the original wheat-berry is thoroughly intermixed with the flour by means of the agitation of the latter within the casing 53 by means of the flights 61 and combines with the flour, thereby increasing its strength, flavor, and nutritive qualities. The flour thus treated is passed through the discharge-duct 56 into a suitable receptacle.

While we have shown and described an electrifying apparatus which in practice would produce an arc or flame of electricity, we wish it understood that we do not limit our invention to the particular form of electrifying apparatus herein shown, as we may employ the silent electric discharge or any character of electric discharge which will operate to sterilize the vapor and to render it capable of more readily combining with the flour. Without endeavoring to outline any theory in the matter, we will merely state that we have found that when the vapor has been subjected to electrical action it will more readily impart its valuable constituents to the flour than when not so treated.

It will be apparent that we may vary the precise construction herein described and illustrated without departing from the spirit of our invention, and we do not wish to be limited to details of construction except in so far as specified in the claims following.

Having thus fully described our invention, what we claim as new is—

1. The process of treating food products, which consists in vaporizing a portion of the constituents of a product and subjecting such vapor to electrical action, and then conducting the vapor into the presence of the food product to be treated.

2. The process of treating food products which consists in dampening a product, then heating the same to vaporize a portion of its constituents, then subjecting the vapor to electrical action, and finally conducting the vapor into the presence of the food product to be treated.

3. The process of treating flour which consists in vaporizing a portion of the constituents of the offal and germ of the wheat-berry, subjecting said vapor to electrical action, and then conducting it into the presence of the flour.

4. The process of treating flour which consists in vaporizing a portion of the constituents of the by-products of the wheat-berry from which the flour has been made, subjecting said vapor to electrical action, and then conducting the vapor into the presence of the finished flour during agitation of the latter.

5. The process of treating flour which consists in dampening the by-products of the wheat-berry from which the flour is made, then heating said by-products to vaporize a portion of their constituents, then withdrawing said vapor and subjecting the same to electrical action, and finally conducting the vapor into the presence of the flour during agitation of the latter.

In testimony whereof we have hereunto set our hands in presence of two subscribing witnesses.

PHILIP HEYDE.
JOHN E. MITCHELL.

Witnesses:
MARK MAITLAND,
J. N. BONNER.